United States Patent
Lang

(10) Patent No.: US 10,831,464 B2
(45) Date of Patent: Nov. 10, 2020

(54) INSTALLATION OF OPERATING SYSTEM

(71) Applicant: New H3C Information Technologies Co., Ltd., Hangzhou (CN)

(72) Inventor: Lina Lang, Beijing (CN)

(73) Assignee: New H3C INFORMATION TECHNOLOGIES CO., LTD., Hangzhou (CN)

( * ) Notice: Subject to any disclaimer, the term of this patent is extended or adjusted under 35 U.S.C. 154(b) by 137 days.

(21) Appl. No.: 16/322,525

(22) PCT Filed: Sep. 22, 2017

(86) PCT No.: PCT/CN2017/102906
§ 371 (c)(1),
(2) Date: Feb. 1, 2019

(87) PCT Pub. No.: WO2018/054351
PCT Pub. Date: Mar. 29, 2018

(65) Prior Publication Data
US 2020/0272445 A1 Aug. 27, 2020

(30) Foreign Application Priority Data
Sep. 23, 2016 (CN) .......................... 2016 1 0846683

(51) Int. Cl.
G06F 8/61 (2018.01)
G06F 9/4401 (2018.01)
G11B 20/10 (2006.01)

(52) U.S. Cl.
CPC .............. G06F 8/61 (2013.01); G06F 9/4406 (2013.01); G11B 20/10 (2013.01); *G06F 8/63* (2013.01); *G11B 2020/10833* (2013.01)

(58) Field of Classification Search
CPC ... G06F 8/60–64; G06F 9/4406; G11B 20/10; G11B 2020/10833
(Continued)

(56) References Cited

U.S. PATENT DOCUMENTS

2004/0073783 A1* 4/2004 Ritchie .................. G06F 9/4406
713/1
2007/0136568 A1 6/2007 Ding
(Continued)

FOREIGN PATENT DOCUMENTS

CN 105446771 3/1916
CN 105824678 8/1916
(Continued)

OTHER PUBLICATIONS

Can an install image be written to a hard disk?, superuser.com, Jun. 21, 2014, 2 pages, [retrieved on Aug. 29, 2020], Retrieved from the Internet: <URL:https://superuser.com/questions/771686/can-an-install-image-be-written-to-a-hard-disk>.*

(Continued)

*Primary Examiner* — Geoffrey R St. Leger
(74) *Attorney, Agent, or Firm* — Norton Rose Fulbright US LLP

(57) ABSTRACT

Provided are a method and terminal device for installing an operating system. The method includes: copying an installation boot file in a mirror file of a to-be-installed-operating system into a root directory of a removable storage device attached to the terminal device, the mirror file being stored in the removable storage device; creating an installation script file where a pre-installation script indicates the mirror file is to be mounted to a first folder of the terminal device; designating in the installation script file that a storage address of software installation packages is that of the first folder; adding the installation script file to the mirror file and copying the updated mirror file into a hard disk, where the operating system is to be installed, in the terminal device to obtain a startup disk; and installing the operating system in the hard disk with the startup disk and installation boot file.

14 Claims, 4 Drawing Sheets

(58) Field of Classification Search
USPC .................................................. 717/174–178
See application file for complete search history.

(56) References Cited

U.S. PATENT DOCUMENTS

| | | | |
|---|---|---|---|
| 2008/0320473 | A1 | 12/2008 | Laska et al. |
| 2009/0182851 | A1* | 7/2009 | King .................. G06F 8/61 709/222 |
| 2013/0254759 | A1 | 9/2013 | Xu et al. |
| 2015/0058839 | A1* | 2/2015 | Madanapalli ........... G06F 8/656 718/1 |

FOREIGN PATENT DOCUMENTS

| | | |
|---|---|---|
| CN | 102147741 | 8/2011 |
| CN | 102520989 | 6/2012 |
| CN | 102955706 | 3/2013 |
| CN | 103488515 | 1/2014 |
| CN | 103744710 | 4/2014 |
| CN | 104932919 | 9/2015 |
| CN | 105183521 | 12/2015 |
| KR | 1020050098605 | 10/2005 |

OTHER PUBLICATIONS

Modifying ISO image to include kickstart file and other useful files, softpanorama.org, Aug. 20, 2013, 2 pages, [retrieved on Aug. 28, 2020], Retrieved from the Internet: <URL:https://web.archive.org>.*

Install from USB After Booting with PE—Install from USB without Booting from USB by using U_XP_SET, rebootpro.com, Jan. 4, 2010, 19 pages, [retrieved on Aug. 29, 2020], Retrieved from the Internet: <URL:http://reboot.pro/topic/10138-install-from-usb-after-booting-with-pe/>.*

Yadav, S., Stop Wasting CDs; Install Linux Straight from an ISO, OpenSource For You.com, Mar. 1, 2009, 7 pages, [retrieved on Aug. 27, 2020], Retrieved from the Internet: <URL:https://www.opensourceforu.com/2009/03/install-linux-straight-from-an-iso/>.*

Kralik, L., Analysis for Automated Unattended Installation, Recent Advances in Automatic Control, Information and Communications, 2013, pp. 163-167, [retrieved on Aug. 27, 2020], Retrieved from the Internet: <URL:http://www.wseas.us/e-library/conferences/2013/Valencia/ACIC/ACIC-30.pdf>.*

Karna, A. K., Multipurpose USB Hard Disk: Your Mini Laptop, 2010 Second International Conference on Information Technology and Computer Science, Jul. 24-25, 2010, pp. 357-360, [retrieved on Aug. 27, 2020], Retrieved from the Internet: <URL:http://ieeexplore.ieee.org/>.*

"Kickstart and booting making of a mirror" ctrry. Apr. 26, 2015, URL: https://blog.51cto.com/ctrry/_1638582 (English Translation provided).

Office Action issued in corresponding Chinese application No. 201610846683.1, dated Dec. 25, 2019 (English Translation provided).

International Search Report and Written Opinion issued in International Patent Application No. PCT/CN2017/102906, dated Nov. 30, 2017.

Extended European Search Report issued in European Patent Application No. 17852419, dated Aug. 5, 2019.

"Part 2: Installation and Basic Configuration Installing from USB memory while a Remote Access Environment Also Provisioned" *Nikkei Linux*, Nov. 8, 2009, vol. 11, 12, pp. 21-28 (English Translation Provided).

Notice of Allowance issued in Corresponding Japanese Application No. 2019515571, dated Jul. 21, 2020 (No English translation provided).

Notification to Grant Patent Right for Invention issued in Corresponding Chinese Application No. 201610846683.1, dated Jun. 28, 2020 (English translation provided).

* cited by examiner

INSTALLATION OF OPERATING SYSTEM

CROSS REFERENCE TO RELATED APPLICATION

This application is a national phase under 35 U.S.C. § 371 of International Application No. PCT/CN2017/102906, filed Sep. 22, 2017, which claims priority to Chinese Patent Application No. 201610846683.1 filed on Sep. 23, 2016, the entire contents of each of which are incorporated herein by reference in their entirety.

BACKGROUND

An operating system, when being installed on a terminal device such as a server, is typically installed by using a Compact Disc Read-Only Memory (CDROM), a File Transfer Protocol (FTP), or the like. If it is desired to install the operating system using a USB flash disk, the USB flash disk needs to be made into a startup disk by means of a special creating tool, and then the startup disk is used to install the operating system.

DETAILED DESCRIPTION OF THE EMBODIMENTS

Figure 1:
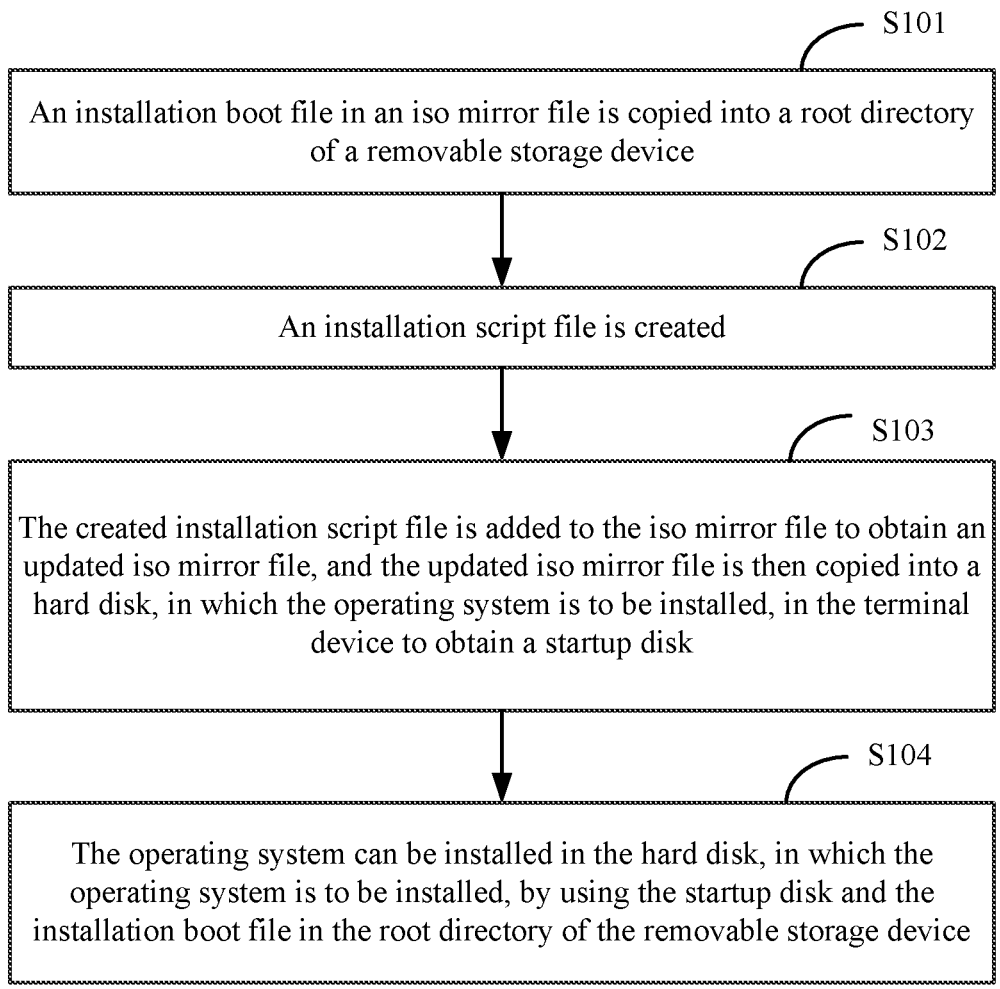
FIG. 1 illustrates a flow diagram of a method of installing an operating system according to an exemplary example of the present disclosure.

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are examples of a device and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

The following examples of the present disclosure provide a method of installing an operating system and a device for installing an operating system to which the method may be applied.

Under the circumstance that an iso mirror file of a to-be-installed-operating system is stored in a removable storage device attached to a terminal device to install an operating system, the method according to an example of the present disclosure includes different blocks as shown in FIG. 1.

At block 101, an installation boot file in an iso mirror file is copied into a root directory of a removable storage device.

At block 102, an installation script file is created, where a pre-installation script in the script file is used to indicate that the iso mirror file is to be mounted to a first folder of a terminal device, and it is designated in the installation script file that a storage address of a software installation package in the iso mirror file is a storage address of the first folder.

At block 103, the created installation script file is added to the iso mirror file to obtain an updated iso mirror file, and the updated iso mirror file is then copied into a hard disk, in which the operating system is to be installed, in the terminal device such that the hard disk, in which the operating system is to be installed, becomes a startup disk.

At block 104, the operating system can be automatically installed in the hard disk, in which the operating system is to be installed, by using the startup disk and the installation boot file in the root directory of the removable storage device, and automatic installation of the operating system is eventually achieved.

The above-mentioned removable storage device may specifically be a USB flash disk, a mobile hard disk, a Secure Digital (SD) memory card, or the like. "Mount" is a Linux command, which allows a partition to be mounted to a folder to associate the partition with the folder. Thus, accessing the folder is equivalent to accessing the partition.

In the method according to the above example, there is no need to make a USB flash disk into a startup disk, thereby avoiding changing the USB flash disk. Moreover, a user does not need to make the USB flash disk into the startup disk with a special creating tool, and thus can perform operations simply and conveniently. Additionally, the installation boot file is copied into the root directory of the removable storage device, and the iso mirror file is mounted to the first folder of the terminal device through the installation script file, i.e., "mounted" to a memory. Furthermore, the storage address of the software installation package is designated as the storage address of the first folder, i.e., a storage address in the memory. Therefore, automatic installation of the operating system may be achieved just by using one hard disk in the terminal device.

Figure 2:
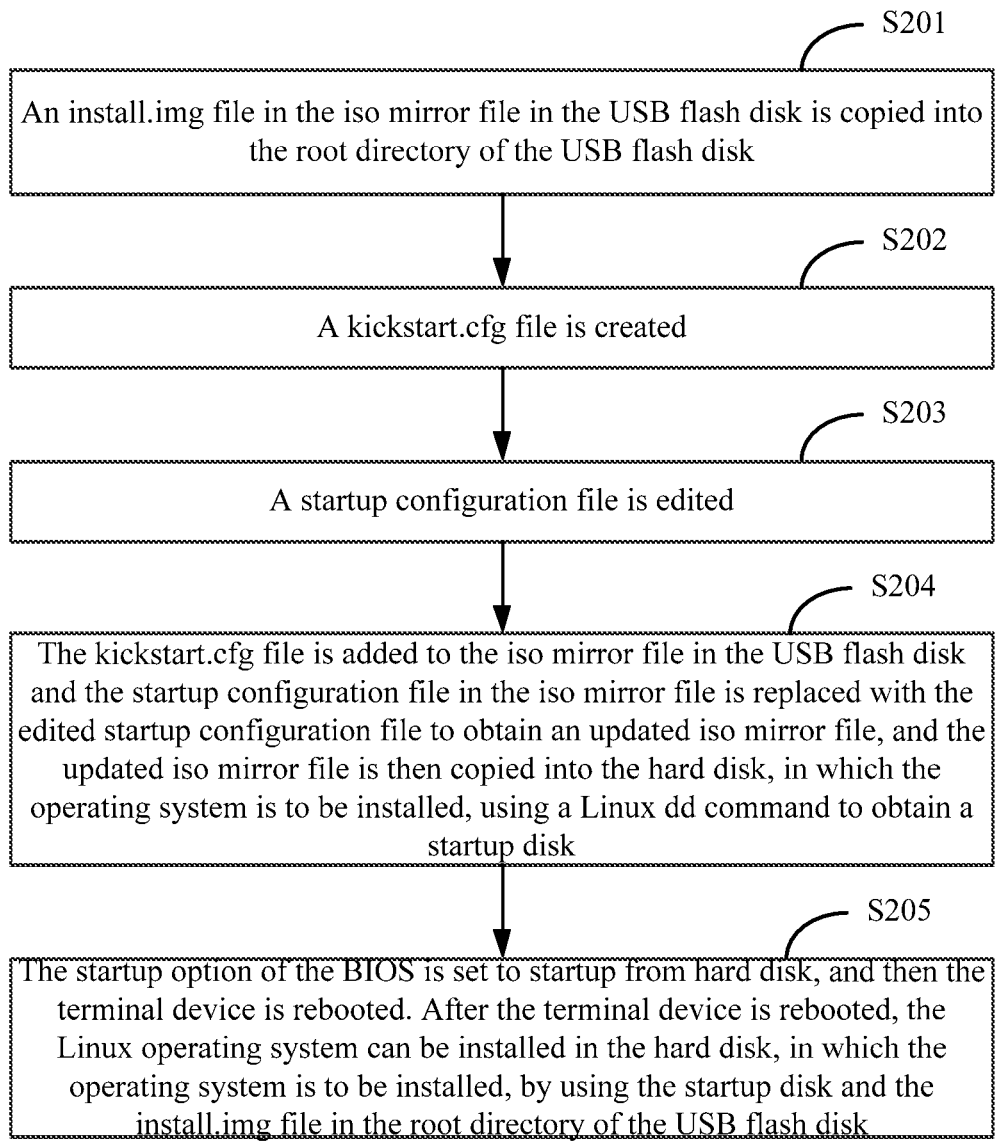
FIG. 2 illustrates a flow diagram of a method of installing an operating system according to another exemplary example of the present disclosure.

The method of installing an operating system according to the above example will be described in detail with an example where the terminal device to install the operating system is a server to install a Linux operating system and the removable storage device is a USB flash disk. When the Linux operating system is to be installed on the server, a USB flash disk that stores the iso mirror file of the Linux operating system is attached to the server. Then, as shown in FIG. 2, the method of installing the operating system executed by the terminal device includes the following blocks.

At block S201, an install.img file in the iso mirror file in the USB flash disk is copied into the root directory of the USB flash disk, where the install.img file is an installation boot file.

Firstly, a folder is created on the terminal device, which is referred to as a second folder, and the USB flash disk is then mounted to the second folder. Afterwards, another folder is created on the terminal device, which is referred to as a third folder, and the iso mirror file in the second folder is mounted to the third folder. Next, the install.img file in the third folder is copied into the second folder, which specifically includes: copying the install.img file into the second folder using a Linux cp command.

During the copying process, since a search path for the install.img file is /images/install.img during installing of the operating system, the install.img file is to be stored in the root directory of the USB flash disk in accordance with this path as well. Thus, when the install.img file is actually copied, a parent directory of the install.img file, i.e., images folder, may be copied into the root directory of the USB flash disk.

The install.img file may be copied into the root directory of the USB flash disk by executing the block S201. That is, the install.img file is located in the root directory of the USB flash disk as shown in FIG. 2. The purpose of executing the block S201 is to enable obtaining the boot file from the USB flash disk in the process of installing the operating system.

At block S202, a kickstart.cfg file is created.

The kickstart.cfg file is an installation script file, which may also be referred to as a ks.cfg file. This file is a simple text file which contains a series of command options for automatically installing the operating system, such as an option for an installation manner, a repo option, and the like. And some scripts such as a pre-installation script (starting with % pre command), a post-installation script (starting with % post command) are contained as well. The repo option is used to designate an additional yum library as an installation source for the software package.

In the example of the present disclosure, in the block S202, the pre-installation script in the kickstart.cfg file is configured to indicate that the iso mirror file is to be mounted to the first folder of the terminal device, and the storage address of software installation packages is designated in the kickstart.cfg file as the storage address of the first folder. Additionally, the option for the installation manner in the kickstart.cfg file is set to hard disk manner, and a hardware partition is set to a USB flash disk.

Since a search path for the packages is baseurl+name (a base address+a name), the method of designating in the kickstart.cfg file the storage address of the packages as the storage address of the first folder may be as follows: setting the repo option of the kickstart.cfg file in the form of baseurl+packages, where the baseurl is set as the storage address of the first folder. It thus can be seen that all the software installation packages are from the additional yum library in an example of the present disclosure.

For example, the repo option is set as follows:

repo-name="Packages"-baseurl=file:///mnt/app_iso, where file:///mnt/app_iso is the storage address of the first folder.

The purpose of mounting the iso mirror file to the first folder and designating the storage address of the packages as the storage address of the first folder is as follows: the iso mirror file in the USB flash disk may be mounted to the memory by mounting the iso mirror file to the first folder, and then the storage address of the packages is designated as the storage address in the memory so as to avoid copying larger packages into the root directory of the USB flash disk, thereby saving the space of the USB flash disk. As shown in FIG. 2, the software installation packages are located in the memory.

At block S203, a startup configuration file is edited.

When a startup mode of a Basic Input Output System (BIOS) is a legacy mode (a traditional BIOS startup mode), the startup configuration file is an isolinux.cfg file. When the startup mode of the BIOS is a UEFI mode (a new BIOS startup mode), the startup configuration file is a BOOTX64.conf file.

The edition of the startup configuration file mainly includes the following two aspects: increasing options for automatic installation and designating the kickstart.cfg file to be used in the process of installing the operating system. By increasing the options for automatic installation and using the kickstart.cfg file in the installing process, automatic installation of the operating system may be achieved.

At block S204, the kickstart.cfg file is added to the iso mirror file in the USB flash disk and the startup configuration file in the iso mirror file is replaced with the startup configuration file edited in the block S203 to obtain an updated iso mirror file, and the updated iso mirror file is then copied into the hard disk, in which the operating system is to be installed, using a Linux dd command to obtain a startup disk.

Figure 3:
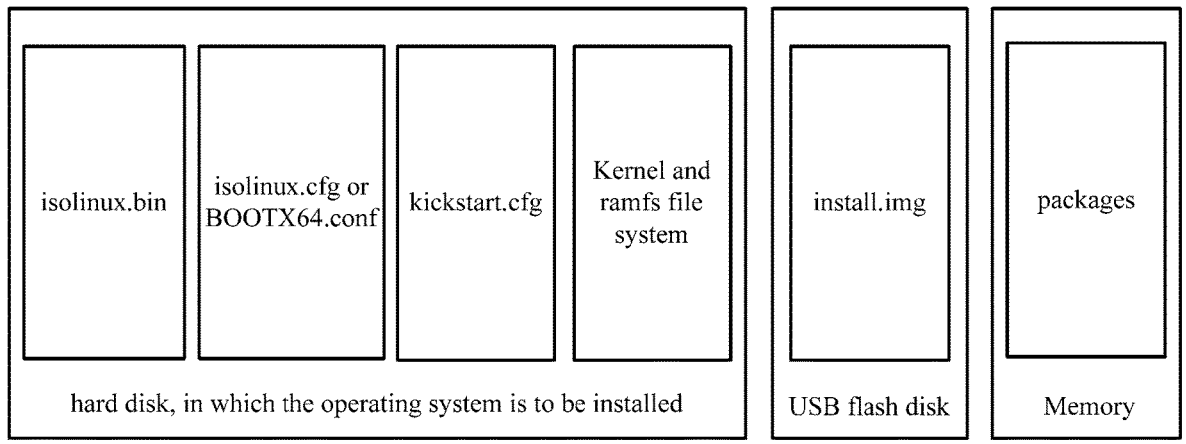
FIG. 3 illustrates a schematic diagram of storage locations of different files and programs according to an exemplary example of the present disclosure.

After the updated iso mirror file is copied into a hard disk, in which the operating system is to be installed, using the Linux dd command, the hard disk, in which the operating system is to be installed, becomes a self-starting hard disk, i.e., a startup disk. In this case, the startup disk contains a number of installable files and programs, as shown in FIG. 3, including an isolinux.bin file, the startup configuration file (isolinux.cfg file or BOOTX64.conf file), the kickstart.cfg file, a kernel and a ramfs file system, etc.

At block S205, the startup option of the BIOS is set to startup from hard disk, and then the terminal device is rebooted. After the terminal device is rebooted, the Linux operating system can be installed in the hard disk, in which the operating system is to be installed, by using the startup disk and the install.img file in the root directory of the USB flash disk.

Figure 4:
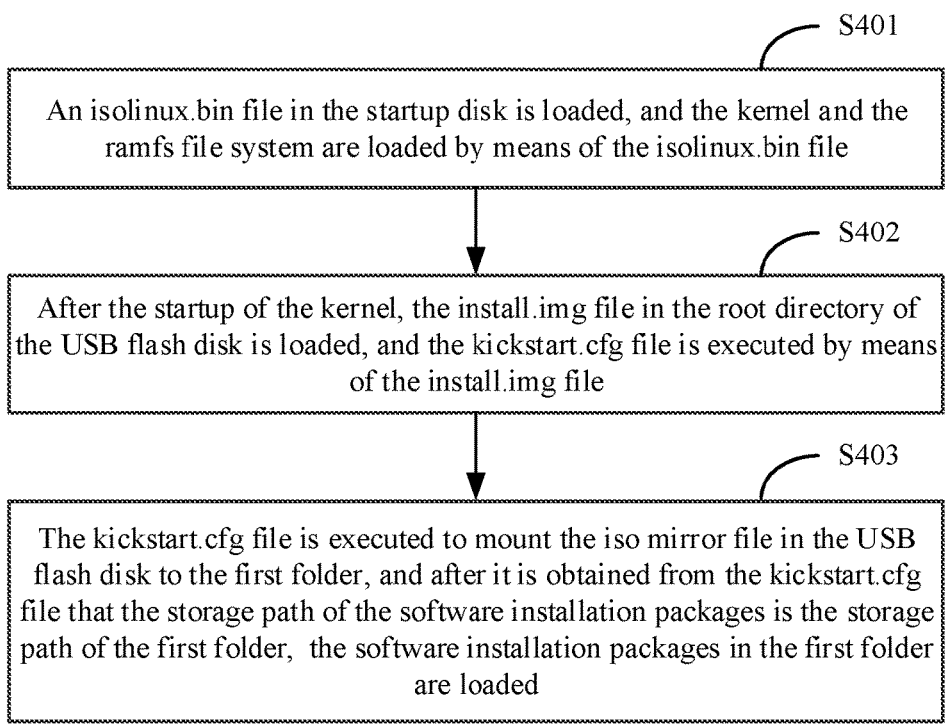
FIG. 4 illustrates a flow chart of a method of installing a Linux operating system on a server according to an exemplary example of the present disclosure.

Specifically, an operation flow of installing the Linux operating system in the hard disk, in which the operating system is to be installed, is as shown in FIG. 4, and includes the following blocks.

At block S401, an isolinux.bin file in the startup disk is loaded, and the kernel and the ramfs file system are loaded by means of the isolinux.bin file.

The isolinux.bin file is a compact disk boot file. In the block S401, the startup configuration file (the isolinux.cfg file or the BOOTX64.conf file) may be searched for automatically after the isolinux.bin file is run, and a vmlinuz file and an initrd.img file are obtained and loaded according to storage addresses of the two files recorded in the startup configuration file, thereby achieving loading of the kernel and the ramfs file system.

The vmlinuz file is a kernel file, where vmlinuz is a bootable and compactable kernel, and vm represents Virtual Memory. The ramfs file system is a file system stored based on a Random-Access Memory (RAM) in Linux.

At block S402, after the startup of the kernel, the install.img file in the root directory of the USB flash disk is loaded, and the kickstart.cfg file is executed by means of the install.img file.

Specifically, after the startup of the kernel, the install.img file may be loaded, and the anaconda program may be executed, where the anaconda program is a real system installation program. When the install.img file is loaded, the kickstart.cfg file may be parsed out and executed according to the storage address of the kickstart.cfg file designated in the startup configuration file.

At block S403, the kickstart.cfg file is executed to mount the iso mirror file in the USB flash disk to the first folder, and after it is obtained from the kickstart.cfg file that the storage address of the packages is the storage address of the first folder, the packages in the first folder are loaded.

For example, in the process of executing the kickstart.cfg file, the iso mirror file in the USB flash disk may be mounted to the first folder in accordance with the content of the pre-installation script in the file. For example, a fourth folder is created on the terminal device, and the USB flash disk is mounted to the fourth folder. Then, the first folder is created on the terminal device, and the iso mirror file in the fourth folder is mounted to the first folder.

The storage address of the packages is obtained as that of the first folder according to the repo option in the kickstart.cfg file. After the packages are obtained according to the storage address of the first folder, the anaconda program may load the installation packages in the format of RPM Package Manager (rpm) among the packages.

Thus, the installation process of the Linux operating system is completed.

As can be seen from the above, the method according to the above examples of the present disclosure produces the following technical effects:

(1) There is no need to make the USB flash disk into the startup disk, thereby avoiding changing the USB flash disk. Moreover, a user does not need to make the USB flash disk into the startup disk with a special creating tool, and thus can perform operations simply and conveniently. Moreover, automatic installation of the operating system may be achieved just by using one hard disk in the terminal device.

(2) The install.img file in the iso mirror file in the USB flash disk is copied into the root directory of the USB flash disk such that the installation boot file can be obtained from the USB flash disk in the process of installing the operating system.

(3) The pre-installation script of the installation script file is executed to mount the iso mirror file to the first folder, thereby mounting the iso mirror file to the memory, and then the storage address of the software installation packages is designated as that of the first folder. Therefore, the iso mirror file in the USB flash disk can be directly accessed via the first folder so as to load the software installation packages therein. In this way, there is no need to copy the software installation packages of a big data size (about 3G) that may occupy a large space of the USB flash disk into the root directory, thereby saving the space of the USB flash disk.

The present disclosure also provides examples of a device for installing an operating system corresponding to the previously described examples of the method of installing an operating system.

The examples of the device for installing an operating system in the present disclosure may be applied to a terminal device such as a PC or a server. The device examples may be implemented by software, or by hardware or a combination thereof.

Figure 5:
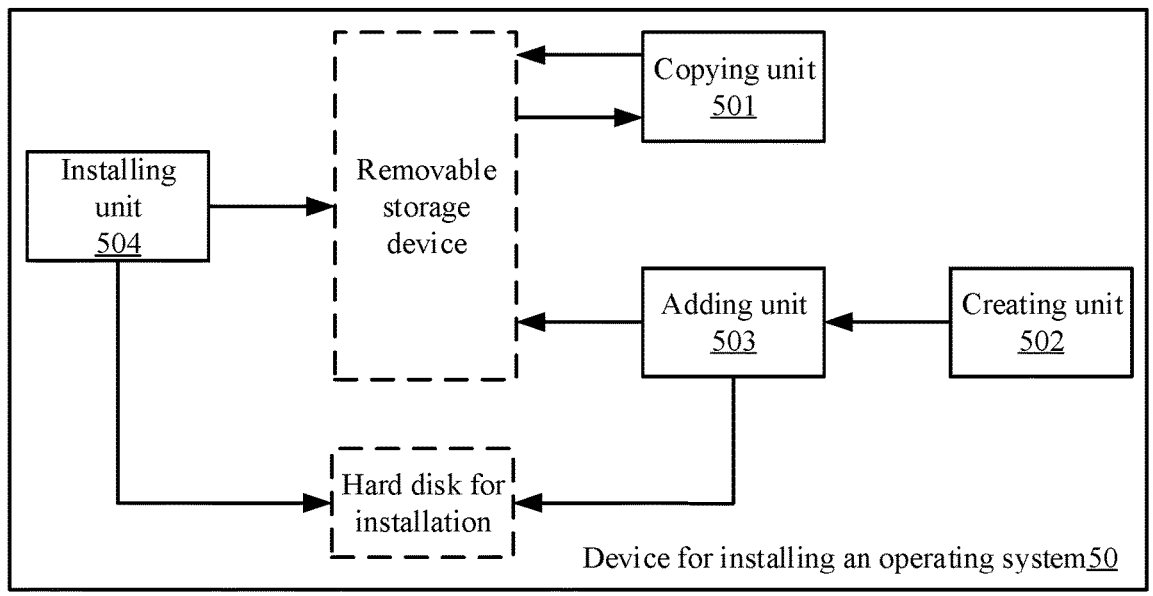
FIG. 5 illustrates a schematic structure diagram of a device for installing an operating system according to an exemplary example of the present disclosure.

FIG. 5 illustrates a schematic structure diagram of a device for installing an operating system. The device 50 for installing an operating system according to an example of the present disclosure includes a copying unit 501, a creating unit 502, an adding unit 503, and an installing unit 504.

The copying unit 501 is configured to copy an installation boot file in an iso mirror file in a removable storage device into a root directory of the removable storage device.

The creating unit 502 is configured to create an installation script file in which a pre-installation script is used to indicate that the iso mirror file in the removable storage device is to be mounted to a first folder of a terminal device, and designate in the installation script file that a storage address of software installation packages is that of the first folder;

The adding unit 503 is configured to add the installation script file created by the creating unit 502 to the iso mirror file in the removable storage device and copy the updated iso mirror file into a hard disk, in which the operating system is to be installed, in the terminal device to obtain a startup disk.

The installing unit 504 is configured to install an operating system in the hard disk, in which the operating system is to be installed, by using the startup disk obtained by the adding unit 503 and the installation boot file in the root directory of the removable storage device.

The copying unit 501 copies the installation boot file in the iso mirror file into the root directory of the removable storage device in the following manner:
creating a second folder on the terminal device, and mounting the removable storage device to the second folder;
creating a third folder on the terminal device, and mounting the iso mirror file in the second folder to the third folder; and
copying the installation boot file in the third folder into the second folder.

The creating unit 502 designates in the installation script file that the storage address of the software installation packages is that of the first folder in the following manner:
setting a repo option of the installation script file in a form of baseurl+name of the software installation packages, where the baseurl is set as the storage address of the first folder.

The adding unit 503 copies the updated iso mirror file into the hard disk, in which the operating system is to be installed, by using a Linux dd command to obtain a startup disk.

The installing unit 504 installs the operating system in the hard disk, in which the operating system is to be installed, in the following manner:
loading a compact disk boot file in the startup disk, and loading a kernel and a ramfs file system by means of the compact disk boot file;
loading the installation boot file in the root directory of the removable storage device after startup of the kernel, and executing the installation script file by means of the installation boot file;
mounting the iso mirror file in the removable storage device to the first folder by executing the installation script file; and
loading the software installation packages in the first folder after obtaining from the installation script file that the storage address of the software installation packages is that of the first folder.

For example, the installing unit 504 mounts the iso mirror file in the removable storage device to the first folder by the following steps:

creating a fourth folder on the terminal device, and mounting the removable storage device to the fourth folder; and creating the first folder on the terminal device, and mounting the iso mirror file in the fourth folder to the first folder.

When the to-be-installed-operating system is a Linux operating system, the installation boot file copied by the copying unit 501 is an install.img file; the installation script file created by the creating unit 502 is a kickstart.cfg file, and the storage address of the software installation packages is designated in the kickstart.cfg file; and the compact disk boot file loaded by the installing unit 504 is an isolinux.bin file.

Details of the implementation processes of the functions and actions of different units in the device discussed above can be found in the implementation processes of corresponding blocks in the method discussed above, which will not be redundantly described herein.

Figure 6:
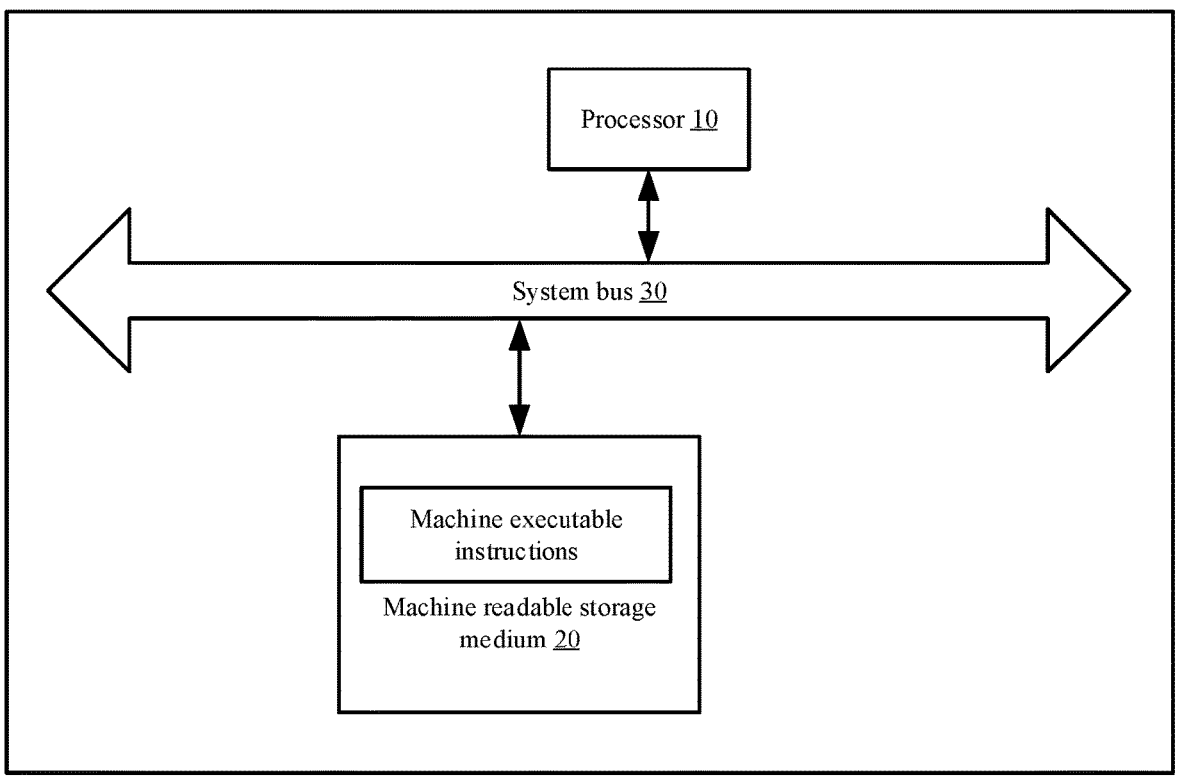
FIG. 6 illustrates a schematic structure diagram of a terminal device according to an exemplary example of the present disclosure.

FIG. 6 illustrates a schematic structure diagram of a terminal device to which a method of installing an operating system according to the examples of the present disclosure is applied. The terminal device includes a processor 10, and a machine-readable storage medium 20 that stores machine-executable instructions. The processor 10 and the machine-readable storage medium 20 may communicate with each other via a system bus 30. Also, by reading and executing the machine-executable instructions in the machine-readable storage medium 20, the processor 10 may be caused to execute the above-described method of installing an operating system. Typically, the terminal device may also include other hardware according to the actual functions thereof, which will not be redundantly described herein.

For example, when reading and executing the machine-executable instructions in the machine-readable storage medium 20, the processor 10, may be caused to execute the following operations:
copying an installation boot file in an iso mirror file of a to-be-installed-operating system into a root directory of a removable storage device attached to the terminal device, where the iso mirror file is stored on the removable storage device;
creating an installation script file, where the installation script file includes a pre-installation script used to indicate that the iso mirror file is to be mounted to a first folder of the terminal device;
designating in the installation script file that a storage address of software installation packages in the iso mirror file is that of the first folder;
obtaining an updated iso mirror file by adding the installation script file to the iso mirror file;
obtaining a startup disk by copying the updated iso mirror file into a hard disk, in which the operating system is to be installed, in the terminal device; and
installing the operating system in the hard disk, in which the operating system is to be installed, by using the startup disk and the installation boot file in the root directory of the removable storage device.

In an example, when copying the installation boot file in the iso mirror file into the root directory of the removable storage device, the processor may be further caused by the machine-executable instructions to:
create a second folder on the terminal device, and mount the removable storage device to the second folder;
create a third folder on the terminal device, and mount the iso mirror file in the second folder to the third folder; and
copy the installation boot file in the third folder into the second folder.

In another example, when designating in the installation script file that the storage address of the software installation packages is that of the first folder, the processor may be further caused by the machine-executable instructions to:
set a repo option of the installation script file in a form of baseurl+name of the software installation packages; and
set the baseurl as the storage address of the first folder.

In further another example, when copying the updated iso mirror file into the hard disk, in which the operating system is to be installed, in the terminal device to obtain the startup disk, the processor may be further caused by the machine-executable instructions to:
copy the updated iso mirror file into the hard disk, in which the operating system is to be installed, by using a Linux dd command.

In yet another example, when installing the operating system in the hard disk, in which the operating system is to be installed, the processor may be further caused by the machine-executable instructions to:
load a compact disk boot file in the startup disk;
load a kernel and a ramfs file system via the compact disk boot file;
load the installation boot file in the root directory of the removable storage device after startup of the kernel;
execute the installation script file by means of the loaded installation boot file to mount the iso mirror file in the removable storage device to the first folder; and
load the software installation packages in the first folder after obtaining from the installation script file that the storage address of the software installation packages is that of the first folder.

In still another example, when mounting the iso mirror file in the removable storage device to the first folder, the processor may be further caused by the machine-executable instructions to:
create a fourth folder on the terminal device, and mount the removable storage device to the fourth folder; and
create the first folder on the terminal device, and mount the iso mirror file in the fourth folder to the first folder.

In still another example, when the operating system is a Linux operating system,
the installation boot file is an install.img file;
the installation script file is a kickstart.cfg file, and the storage address of the software installation packages is designated in the kickstart.cfg file; and
the compact disk boot file is an isolinux.bin file.

The processor 10 may achieve the above-described method of installing an operating system by reading and executing the machine-executable instructions in the machine-readable storage medium 20.

According to an example of the present disclosure, there is also provided a machine-readable storage medium that stores machine-executable instructions which cause, when being invoked and executed, the processor to:
copy an installation boot file in an iso mirror file of an operating system, in which the operating system is to be installed, into a root directory of a removable storage device attached to a terminal device, where the iso mirror file is stored in the removable storage device;
create an installation script file, where the installation script file includes a pre-installation script used to indicate that the iso mirror file is to be mounted to a first folder of the terminal device; designate in the installation script file that a storage address of software installation packages in the iso mirror file is that of the first folder;
obtain an updated iso mirror file by adding the installation script file to the iso mirror file;

obtain a startup disk by copying the updated iso mirror file into a hard disk, in which the operating system is to be installed, in the terminal device; and install the operating system in the hard disk, in which the operating system is to be installed, by using the startup disk and the installation boot file in the root directory of the removable storage device.

In an example, when copying the installation boot file in the iso mirror file into the root directory of the removable storage device, the processor may be further caused by the machine-executable instructions to:

create a second folder on the terminal device, and mount the removable storage device to the second folder;

create a third folder on the terminal device, and mount the iso mirror file in the second folder to the third folder; and copy the installation boot file in the third folder into the second folder.

In another example, when designating in the installation script file that the storage address of the software installation packages is that of the first folder, the processor may be further caused by the machine-executable instructions to:

set a repo option of the installation script file in a form of baseurl+name of the software installation packages; and set the baseurl as the storage address of the first folder.

In further another example, when copying the updated iso mirror file into the hard disk, in which the operating system is to be installed, in the terminal device to obtain the startup disk, the processor may be further caused by the machine-executable instructions to:

copy the updated iso mirror file into the hard disk, in which the operating system is to be installed, by using a Linux dd command.

In yet another example, when installing the operating system in the hard disk, in which the operating system is to be installed, the processor may be further caused by the machine-executable instructions to:

load a compact disk boot file in the startup disk;

load a kernel and a ramfs file system via the compact disk boot file;

load the installation boot file in the root directory of the removable storage device after startup of the kernel;

execute the installation script file by means of the loaded installation boot file to mount the iso mirror file in the removable storage device to the first folder; and load the software installation packages in the first folder after obtaining from the installation script file that the storage address of the software installation packages is that of the first folder.

In still another example, when mounting the iso mirror file in the removable storage device to the first folder, the processor may be further caused by the machine-executable instructions to:

create a fourth folder on the terminal device, and mount the removable storage device to the fourth folder; and create the first folder on the terminal device, and mount the iso mirror file in the fourth folder to the first folder.

In still another example, when the operating system is a Linux operating system, the installation boot file is an install.img file;

the installation script file is a kickstart.cfg file, and the storage address of the software installation packages is designated in the kickstart.cfg file; and the compact disk boot file is an isolinux.bin file.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

The above are detailed description of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of installing an operating system, comprising:

copying, by a processor in a terminal device, an installation boot file in an iso mirror file of a to-be-installed-operating system into a root directory of a removable storage device attached to the terminal device, wherein the iso mirror file is stored on the removable storage device;

creating, by the processor, an installation script file, wherein the installation script file comprises a pre-installation script used to indicate that the iso mirror file is to be mounted to a first folder of the terminal device;

designating in the installation script file, by the processor, that a storage address of software installation packages in the iso mirror file is a storage address of the first folder;

obtaining, by the processor, an updated iso mirror file by adding the installation script file to the iso mirror file;

obtaining, by the processor, a startup disk by copying the updated iso mirror file into a hard disk, in which the operating system is to be installed, in the terminal device; and installing, by the processor, the operating system in the hard disk, in which the operating system is to be installed, by using the startup disk and the installation boot file in the root directory of the removable storage device.

2. The method according to claim 1, wherein copying the installation boot file in the iso mirror file into the root directory of the removable storage device comprises:

creating, by the processor, a second folder on the terminal device, and mounting the removable storage device to the second folder;

creating, by the processor, a third folder on the terminal device, and mounting the iso mirror file in the second folder to the third folder; and copying, by the processor, the installation boot file in the third folder into the second folder.

3. The method according to claim 1, wherein designating in the installation script file that the storage address of the software installation packages is the storage address of the first folder comprises:

setting, by the processor, a repo option of the installation script file in a form of baseurl+name of the software installation packages; and setting, by the processor, the baseurl as the storage address of the first folder.

4. The method according to claim 1, wherein copying the updated iso mirror file into the hard disk, in which the operating system is to be installed, in the terminal device comprises:
copying, by the processor, the updated iso mirror file into the hard disk, in which the operating system is to be installed, by using a Linux dd command.

5. The method according to claim 1, wherein installing the operating system in the hard disk, in which the operating system is to be installed, comprises:
loading, by the processor, a compact disk boot file in the startup disk;
loading, by the processor, a kernel and a ramfs file system by means of the compact disk boot file;
loading, by the processor, the installation boot file in the root directory of the removable storage device after startup of the kernel;
executing, by the processor, the installation script file by means of the loaded installation boot file to mount the iso mirror file in the removable storage device to the first folder; and
loading, by the processor, the software installation packages in the first folder after obtaining from the installation script file that the storage address of the software installation packages is the storage address of the first folder.

6. The method according to claim 5, wherein mounting the iso mirror file in the removable storage device to the first folder comprises:
creating, by the processor, a fourth folder on the terminal device, and mounting the removable storage device to the fourth folder; and
creating, by the processor, the first folder on the terminal device, and mounting the iso mirror file in the fourth folder to the first folder.

7. The method according to claim 5, wherein the operating system is a Linux operating system, and
the installation boot file is an install.img file;
the installation script file is a kickstart.cfg file, and the storage address of the software installation packages is designated in the kickstart.cfg file; and
the compact disk boot file is an isolinux.bin file.

8. A terminal device, comprising:
a processor; and
a machine-readable storage medium that stores machine-executable instructions, wherein by executing the machine-executable instructions, the processor is caused to:
copy an installation boot file in an iso mirror file of a to-be-installed-operating system into a root directory of a removable storage device attached to the terminal device, wherein the iso mirror file is stored in the removable storage device;
create an installation script file, wherein the installation script file comprises a pre-installation script used to indicate that the iso mirror file is to be mounted to a first folder of the terminal device;
designate in the installation script file that a storage address of software installation packages in the iso mirror file is a storage address of the first folder;
obtain an updated iso mirror file by adding the installation script file to the iso mirror file;
obtain a startup disk by copying the updated iso mirror file into a hard disk, in which the operating system is to be installed, in the terminal device; and
install the operating system in the hard disk, in which the operating system is to be installed, by using the startup disk and the installation boot file in the root directory of the removable storage device.

9. The device according to claim 8, wherein when copying the installation boot file in the iso mirror file into the root directory of the removable storage device, the processor is further caused by the machine-executable instructions to:
create a second folder on the terminal device, and mount the removable storage device to the second folder;
create a third folder on the terminal device, and mount the iso mirror file in the second folder to the third folder; and
copy the installation boot file in the third folder into the second folder.

10. The device according to claim 8, wherein when designating in the installation script file that the storage address of the software installation packages is the storage address of the first folder, the processor is further caused by the machine-executable instructions to:
set a repo option of the installation script file in a form of baseurl+name of the software installation packages; and
set the baseurl as the storage address of the first folder.

11. The device according to claim 8, wherein when copying the updated iso mirror file into the hard disk, in which the operating system is to be installed, in the terminal device to obtain a startup disk, the processor is further caused by the machine-executable instructions to:
copy the updated iso mirror file into the hard disk, in which the operating system is to be installed, by using a Linux dd command.

12. The device according to claim 8, wherein when installing the operating system in the hard disk, in which the operating system is to be installed, the processor is further caused by the machine-executable instructions to:
load a compact disk boot file in the startup disk;
load a kernel and a ramfs file system by means of the compact disk boot file;
load the installation boot file in the root directory of the removable storage device after startup of the kernel;
execute the installation script file by means of the loaded installation boot file to mount the iso mirror file on the removable storage device to the first folder; and
load the software installation packages in the first folder after obtaining from the installation script file that the storage address of the software installation packages is the storage address of the first folder.

13. The device according to claim 12, wherein when mounting the iso mirror file in the removable storage device to the first folder, the processor is further caused by the machine-executable instructions to:
create a fourth folder on the terminal device, and mount the removable storage device to the fourth folder; and
create the first folder on the terminal device, and mount the iso mirror file in the fourth folder to the first folder.

14. The device according to claim 12, wherein the operating system is a Linux operating system, and
the installation boot file is an install.img file;
the installation script file is a kickstart.cfg file, and the storage address of the software installation packages is designated in the kickstart.cfg file; and
the compact disk boot file is an isolinux.bin file.

* * * * *